United States Patent
Wong et al.

(10) Patent No.: US 6,552,740 B1
(45) Date of Patent: Apr. 22, 2003

(54) METHOD AND APPARATUS FOR PRINTING MONOCHROMATIC IMAGING USING A SPATIAL LIGHT MODULATOR

(75) Inventors: Victor C. Wong, Rochester, NY (US); Badhri Narayan, Rochester, NY (US); Sujatha Ramanujan, Pittsford, NY (US); Dan S. Talbot, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/630,419

(22) Filed: Aug. 1, 2000

(51) Int. Cl.[7] .................................................. B41J 2/47
(52) U.S. Cl. ...................................... 347/239; 347/255
(58) Field of Search ................................ 347/239, 241, 347/255, 256; 349/62, 95, 96, 201; 359/9; 430/355, 353, 543; 353/84; 355/20; 345/87, 89

(56) References Cited

U.S. PATENT DOCUMENTS

| | | | |
|---|---|---|---|
| 4,624,558 A | 11/1986 | Johnson | 355/100 |
| 4,728,965 A | 3/1988 | Kessler et al. | 347/241 |
| 4,777,514 A | 10/1988 | Theer et al. | 355/54 |
| 4,978,970 A * | 12/1990 | Okazaki | 347/241 |
| 5,030,970 A | 7/1991 | Rau et al. | 347/243 |
| 5,325,137 A | 6/1994 | Konno et al. | 353/63 |
| 5,379,135 A * | 1/1995 | Nakagaki et al. | 359/9 |
| 5,461,411 A | 10/1995 | Florence et al. | 347/240 |
| 5,504,514 A | 4/1996 | Nelson | 347/130 |
| 5,521,748 A | 5/1996 | Sarraf | 359/321 |
| 5,652,661 A | 7/1997 | Gallipeau et al. | 358/302 |
| 5,701,185 A | 12/1997 | Reiss et al. | 358/471 |
| 5,743,610 A | 4/1998 | Yajima et al. | 353/31 |
| 5,745,156 A | 4/1998 | Rederico et al. | 347/256 |
| 5,757,348 A * | 5/1998 | Handschy et al. | 345/89 |
| 5,808,800 A | 9/1998 | Handschy et al. | 359/630 |
| 5,863,125 A * | 1/1999 | Doany | 353/84 |
| 5,883,687 A * | 3/1999 | Lu et al. | 349/201 |
| 5,936,708 A * | 8/1999 | Saita | 355/20 |
| 6,084,626 A * | 7/2000 | Ramanujane t al. | 347/239 |
| 6,243,149 B1 * | 6/2001 | Swanson et al. | 349/62 |
| 6,245,496 B1 * | 6/2001 | Yokozawa | 430/543 |

FOREIGN PATENT DOCUMENTS

EP  WO 99/45435  * 9/1999  ............. G03F/7/20

* cited by examiner

*Primary Examiner*—Hai Pham
(74) *Attorney, Agent, or Firm*—Nelson Adrian Blish

(57) ABSTRACT

A method and apparatus for monochromatic printing which records an image from digital image data onto a photosensitive medium (160) is disclosed. The apparatus includes the following: A light source (29) provides the monochromatic illumination. A uniformizer uniformizes a wavefront of light emitted from the light source (29). A polarizer (134) for filtering the uniformized light provides a polarized beam having a predetermined polarization state. A spatial light modulator (52) has a plurality of individual elements capable of altering the polarization state of the polarized beam to provide an exposure beam for printing. A state of each of the elements is controlled according to the digital image data. An optics assembly (11) is used for directing the polarized beam to the modulator and the exposure beam from the spatial light modulator (52). A lens assembly (132) is used for directing the exposure beam onto the photosensitive medium (160).

34 Claims, 9 Drawing Sheets

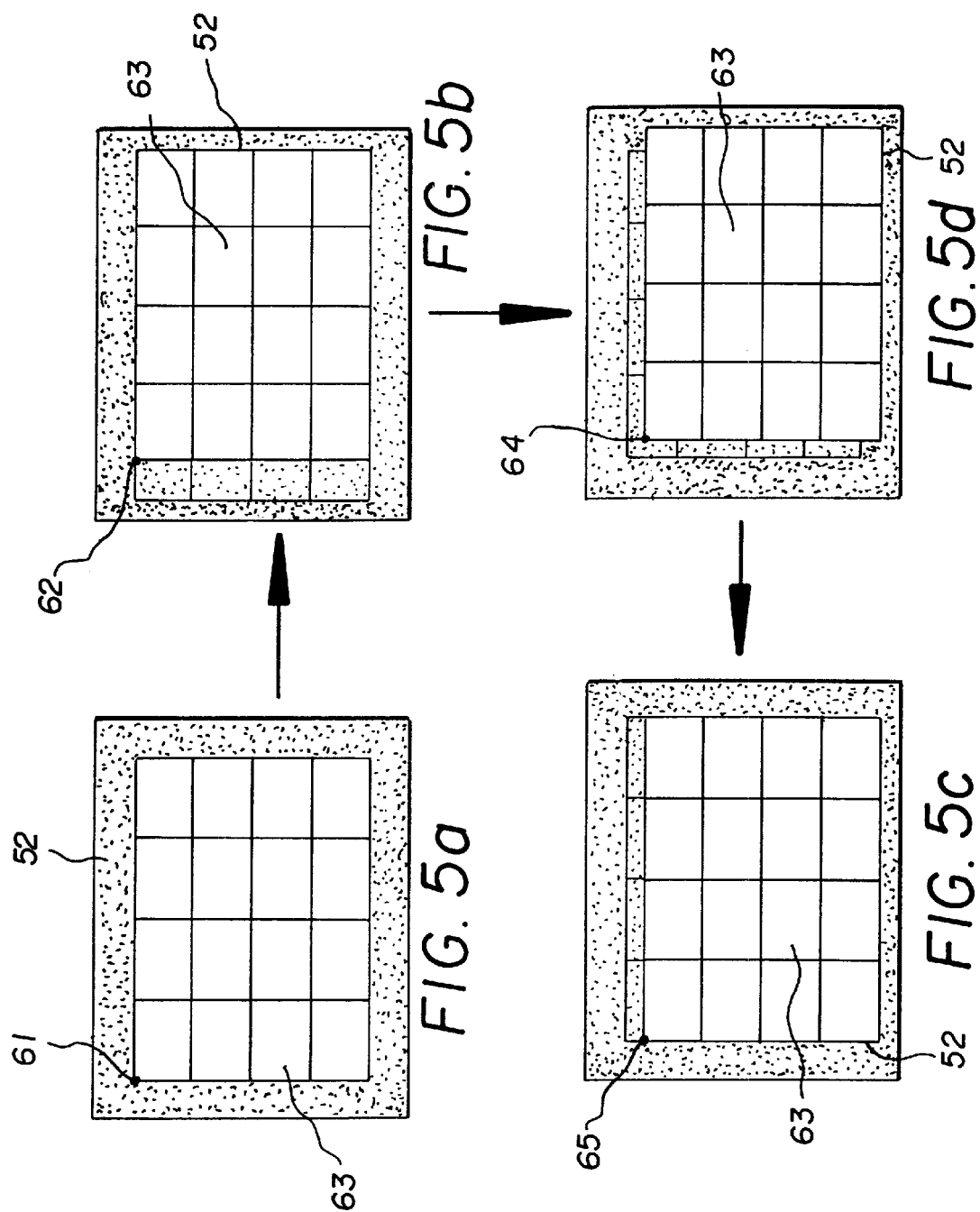

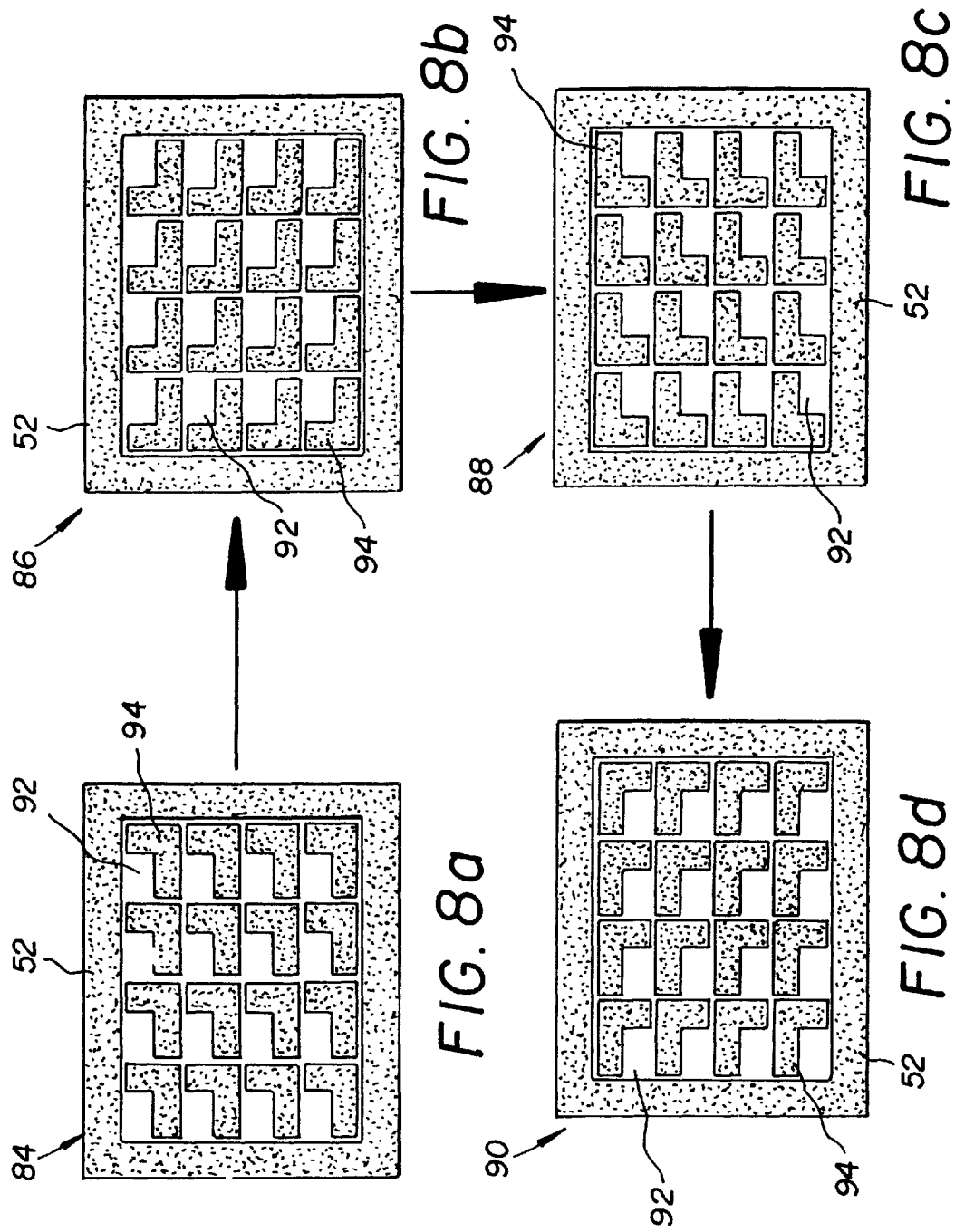

METHOD AND APPARATUS FOR PRINTING MONOCHROMATIC IMAGING USING A SPATIAL LIGHT MODULATOR

Reference is made to commonly-assigned copending U.S. patent application Ser. No. 09/626,633, filed Jul. 26, 2000, entitled A METHOD AND APPARATUS FOR PRINTING MULTIPLE SIMULTANEOUS IMAGES ONTO A PHOTOSENSITIVE MEDIA, by Ramanujan et al.; U.S. patent application Ser. No. 09/618,661, filed Jul. 18, 2000, entitled A METHOD AND APPARATUS FOR PRINTING TO A PHOTOSENSITIVE MEDIA USING MULTIPLE SPATIAL LIGHT MODULATOR, by Ramanujan et al., the disclosures of which are incorporated herein.

FIELD OF THE INVENTION

This invention relates generally to a printing apparatus and method for monochromatic imaging onto a photosensitive media by spatially and temporally modulating a light beam and more particularly to a film recording apparatus capable of forming a high-resolution monochromatic image on photosensitive media.

BACKGROUND OF THE INVENTION

Conventional printers generally adapted to record images provided from digital data onto photosensitive media apply light exposure energy that may originate from a number of different sources and may be modulated in a number of different ways. In photoprocessing apparatus, for example, light exposure energy can be applied from a CRT-based printer. In a CRT-based printer, the digital data is used to modulate a Cathode Ray Tube (CRT), which provides exposure energy by scanning an electron beam of variable intensity along its phosphorescent screen. Alternately, light exposure energy can be applied from a laser-based printer, as is disclosed in U.S. Pat. No. 4,728,965 (Kessler et al.) In a laser-based printer, the digital data is used to modulate the duration of laser on-time or intensity as the beam is scanned by a rotating polygon onto the imaging plane.

CRT and laser-based printers perform satisfactorily for photoprocessing applications, that is, for printing of photographs for consumer and commercial markets. However, in an effort to reduce cost and complexity, alternative technologies have been considered for use in photoprocessing printers. Among suitable candidate technologies under development are two-dimensional spatial light modulators.

Two-dimensional spatial light modulators, such as those using a digital micromirror device (DMD) from Texas Instruments, Dallas, Tex., or using a liquid crystal device (LCD) can be used to modulate an incoming optical beam for imaging. A spatial light modulator can be considered essentially as a two-dimensional array of light-valve elements, each element corresponding to an image pixel. Each array element is separately addressable and digitally controlled to modulate light by transmitting or by blocking transmission of incident light from a light source by affecting the polarization state of light. Polarization considerations are, therefore, important in the overall design of support optics for a spatial light modulator.

There are two basic types of spatial light modulators in current use. The first type developed was the transmission spatial light modulator, which, as its name implies, operates by selective transmission of an optical beam through individual array elements. The second type, a later development, is a reflective spatial light modulator. As its name implies, the reflective spatial light modulator, operates by selective reflection of an optical beam through individual array elements. A suitable example of an LCD reflective spatial light modulator relevant to this application utilizes an integrated CMOS backplane, allowing a small footprint and improved uniformity characteristics.

Conventionally, LCD spatial light modulators have been developed and employed for digital projection systems for image display, such as is disclosed in U.S. Pat. No. 5,325,137 (Konno et al.) and in miniaturized image display apparatus suitable for mounting within a helmet or supported by eyeglasses, as is disclosed in U.S. Pat. No. 5,808,800 (Handschy et al.) LCD projector and display designs in use typically employ one or more spatial light modulators, such as using one for each of the primary colors, as is disclosed in U.S. Pat. No. 5,743,610 (Yajima et al.)

It is instructive to note that imaging requirements for projector and display use (as is typified in U.S. Pat. Nos. 5,325,137; 5,808,800; and 5,743,610) differ significantly from imaging requirements for printing by photoprocessing apparatus. Projectors are optimized to provide maximum luminous flux to a screen, which secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, projection and display systems are optimized for viewing at typical resolutions such as 72 dpi or less, for example. Photographic printing apparatus, on the other hand, must achieve much higher resolution, particularly apparatus designed for micrographics applications, which can be expected to provide 8,000 dpi for some systems. Thus, while LCD spatial light modulators can be used in a range of imaging applications for projection and display to high-resolution printing, the requirements on supporting optics can vary significantly.

Largely because spatial light modulators can offer significant advantages in cost and size, these devices have been proposed for different printing systems, from line printing systems such as the printer depicted in U.S. Pat. No. 5,521,748 (Sarraf), to area printing systems such as the system described in U.S. Pat. No. 5,652,661 (Gallipeau et al.) One approach, using a Texas Instruments DMD as shown in U.S. Pat. No. 5,461,411 offers advantages common to spatial light modulator printing such as longer exposure times using light emitting diodes as a source as shown in U.S. Pat. No. 5,504,514. However, DMD technology is very specific and not widely available. As a result, DMDs may be expensive and not easily scaleable to higher resolution requirements. The currently available resolution using DMDs is not sufficient for all printing needs. Furthermore, there is no clear technology path to increased resolution with DMDs.

A preferred approach for photoprocessing printers uses an LCD-based spatial light modulator. Liquid crystal modulators can be a low cost solution for applications requiring spatial light modulators. Photographic printers using commonly available LCD technology are disclosed in U.S. Pat. Nos. 5,652,661; 5,701,185 (Reiss et al.); and 5,745,156 (Federico et al.). Although the present invention primarily addresses use of LCD spatial light modulators, references to LCD in the subsequent description can be generalized, for the most part, to other types of spatial light modulators, such as the DMD noted above.

Primarily because of their early development for and association with screen projection of digital images, spatial light modulators have largely been adapted to continuous tone (contone) color imaging applications. Unlike other digital printing devices, such as the CRT and laser-based devices mentioned above that scan a beam in a two-dimensional pattern, spatial light modulators image one complete frame at a time. Using an LCD, the total exposure duration and overall exposure energy supplied for a frame can be varied as necessary in order to achieve the desired image density and to control media reciprocity characteristics. Advantageously, for photoprocessing applications, the capability for timing and intensity control of each individual pixel allows an LCD printer to provide grayscale imaging.

Most printer designs using LCD technology employ the LCD as a transmissive spatial light modulator, such as is disclosed in U.S. Pat. Nos. 5,652,661 and 5,701,185. However, the improved size and performance characteristics of reflective LCD arrays have made this technology a desirable alternative for conventional color photographic printing, as is disclosed in commonly-assigned copending U.S. Pat. application Ser. No. 09/197,328, filed Nov. 19, 1998, entitled "Reflective Liquid Crystal Modulator Based Printing System," by Ramanujan et al. As is described in the Ramanujan application, color photographic printing requires multiple color light sources applied in sequential fashion. The supporting illumination optics are required to handle broadband light sources, including use of a broadband beamsplitter cube. The optics system for such a printer must provide telecentric illumination for color printing applications. In summary, in the evolution of photoprocessing systems for film printing, as outlined above, it can be seen that the contone imaging requirements for color imaging are suitably met by employing LCD spatial light modulators as a solution.

Printing systems for micrographics or Computer-Output-Microfilm (COM) imaging, diagnostic imaging, and other specialized monochrome imaging applications present a number of unique challenges for optical systems. In the COM environment, images are archived for long-term storage and retrievability. Unlike conventional color photographic images, microfilm archives, for example, are intended to last for hundreds of years in some environments. This archival requirement has, in turn, driven a number of related requirements for image quality. For image reproduction quality, for example, one of the key expectations for micrographics applications is that all images stored on archival media will be written as high-contrast black and white images. Color film is not used as a medium for COM applications since it degrades much too quickly for archive purposes and is not capable of providing the needed resolution. Grayscale representation, meanwhile, has not been available for conventional micrographics printers. Certainly, bitonal representation is appropriate for storage of alphanumeric characters and for standard types of line drawings such as those used in engineering and utilities environments, for example. In order to record bitonal images onto photosensitive media, exposure energy applied by the printer is either on or off, to create high-contrast images without intermediate levels or grayscale representation.

In addition to the requirement for superb contrast there is a requirement for high resolution of COM output. COM images, for example, are routinely printed onto media at reductions of 40x or more. Overall, micrographics media is designed to provide much higher resolution than conventional dye-based media provides for color photographic imaging. To provide high resolution, micrographics media employs a much smaller AgX grain size in its photosensitive emulsion. Optics components for COM systems are correspondingly designed to maximize resolution, more so than with optical components designed for conventional color photoprocessing apparatus.

Conventional COM printers have utilized both CRT and laser-based imaging optics with some success. However, there is room for improvement. For example, CRT-based printers for COM use, such as disclosed in U.S. Pat. No. 4,624,558 (Johnson) are relatively costly and can be bulky. Laser-based printers, such as disclosed in U.S. Pat. No. 4,777,514 (Theer et al.) present size and cost constraints and can be mechanically more complex, since the laser imaging system with its spinning polygon and beam-shaping optics must be designed specifically for the printer application. In addition, laser printers exhibit high-intensity reciprocity failure when used with conventional photosensitive media, thus necessitating the design of special media for COM use.

More recent technologies employed for COM imaging include use of linear light-emitting diode (LED) arrays, such as in the Model 4800 Document Archive Writer, manufactured by Eastman Kodak Company, Rochester, N.Y. Another alternative is use of a linear light-valve array, such as is disclosed in U.S. Pat. No. 5,030,970 (Rau et al.) However, with both LED arrays and linear light-valve arrays, COM writers continue to be relatively expensive, largely due to the cost of support components and the complexity of drive electronics. There is a long-felt need to lower cost and reduce size and complexity for COM devices, without sacrificing performance or robustness.

A disadvantage of most conventional COM printers has been the need to use aqueous (AgX) development techniques for microfilm media. Most conventional COM printers are not adaptable for use with dry-processed media. Able to be handled in room lighting conditions and free from chemical processing, plumbing, venting, and dark room requirements, dry-processed COM microfilm represents an environmentally advantageous solution for micrographics systems.

It is significant to observe that dry-processed microfilm requires higher levels of exposure energy than must be provided for conventional aqueous media. As a rough indicator of relative exposure levels used to obtain maximum density, for instance, dry-processed microfilm requires 200 ergs/cm$^2$ (nominal) vs. 1 erg/cm$^2$ (nominal) for conventional photographic color media. This high exposure level requirement is above the range that is provided by most conventional COM imaging optics. Until now, only laser-based imaging has been employed to print onto dry-processed microfilm. In response to environmental concerns, it is highly desirable that any alternative COM imaging technology that is developed be able to use dry-processed microfilm.

For reasons outlined in the above description, spatial light modulators have not been adapted for COM printing applications. Widely used for continuous tone color imaging, spatial light modulators have been overlooked for monochrome applications such as for COM and related diagnostic imaging. Grayscale capability, for which LCD spatial light modulators are readily adaptable, has not been pursued for COM applications due, in part, to long-standing customer expectations, which, in turn, are based on limitations of the conventional imaging technologies used. Optical systems employing LCD modulators for color printing address broadband imaging concerns that result in design complexity and performance trade-offs that make these systems less than ideal for COM imaging. For example, color imaging systems such as is disclosed in the Ramanujan application use sequential color frame imaging techniques, necessarily compromising full polychromatic capability for speed. Moreover, the relative resolution requirements for COM printing are an order of magnitude greater than that applied for standard color printing applications. Optical subsystems used in LCD modulator-based color printers make design compromises in order to handle multiple wavelengths, which adversely impacts resolution capability.

Significantly, existing LCD modulators adapted for frame-based color printing applications are designed to provide exposure levels sufficient for aqueous media only. Thus, direct adaptation of existing LCD optical systems designs would not allow a COM printer to take advantage of dry-process microfilm, with its potential support cost and environmental benefits.

To date, conventional COM printers using laser, CRT, or other technologies do not currently provide grayscale capability and are not optimized to provide this capability onto archival media. While grayscale imaging capability has not yet been a requirement of COM users, it is recognized that developments such as the growth of Internet applications and image transfer, image format standardization, and expanding overall use of grayscale images in documents indicate a likely demand of this capability.

Thus, it can be seen that there is a need for environmentally improved imaging solutions in COM environments, with additional requirements to reduce cost and complexity and to provide grayscale imaging potential.

SUMMARY OF THE INVENTION

It is an object of the present invention to provide a printing apparatus using a spatial light modulator for monochromatic imaging onto photosensitive media, where the printing apparatus is capable of grayscale image recording.

With the above object in mind, the present invention provides a printing apparatus for recording digital image data onto photosensitive media, the apparatus comprising:

(a) a monochromatic light source;

(b) a uniformizer for uniformizing a wavefront of light emitted from said light source;

(c) a polarizer for filtering light uniformized by said uniformizing to provide a polarized beam having a predetermined polarization state;

(d) a spatial light modulator having a plurality of individual elements capable of altering said polarization state of said polarized beam to provide an exposure beam for printing, a state of each of said elements controlled according to said digital image data;

(e) an optics assembly for directing said polarized beam to said modulator and said exposure beam from said spatial light modulator; and (f) a lens assembly for directing said exposure beam onto said photosensitive medium.

According to an aspect of the present invention, light is passed through an uniformizer or integrator to provide a source of spatially uniform, monochromatic light for the printing apparatus. The monochromatic light is then polarized and passed through a beamsplitter, which directs a polarized light component onto a spatial light modulator. Individual array elements of the spatial light modulator, controlled according to digital image data, are turned on in order to modulate the polarization rotation of the incident light. Modulation for each pixel can be effected by controlling the level of the light from the light source, by control of the drive voltage to each individual pixel in the spatial light modulator, or by controlling the duration of on-time for each individual array element. The resulting light is then directed through a lens assembly to expose the photosensitive media.

Features of the invention include a polarizer for filtering the polarization of incident light and an exit polarizer for filtering the polarization of output light.

An advantage of the present invention is that it provides a low-cost alternative to existing print methods. Spatial light modulators are commodity components that can be readily adapted in order to fabricate a printing apparatus for photosensitive media.

A further advantage of the present invention is that it provides the capability for grayscale imaging onto COM media.

A further advantage of the present invention is that it provides a simplified design particularly suited for monochrome imaging onto photosensitive media, without the requirements for broadband components and coatings and without concerns for telecentricity as is required for polychromatic imaging.

A further advantage of the present invention is that it allows the use of existing media used for earlier COM printing systems. Thus, introduction of a printer of the present invention is possible without the need to develop a new media having the appropriate response characteristics.

A further advantage of the present invention is that it provides an imaging apparatus that is capable of imaging onto dry-process COM media, with resulting environmental benefits.

These and other objects, features, and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5a–5d illustrate the effect of dithering an un-apertured spatial light modulator using four distinct image positions;

FIGS. 8a–8d illustrate the effect of dithering an apertured spatial light modulator using four distinct image positions;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
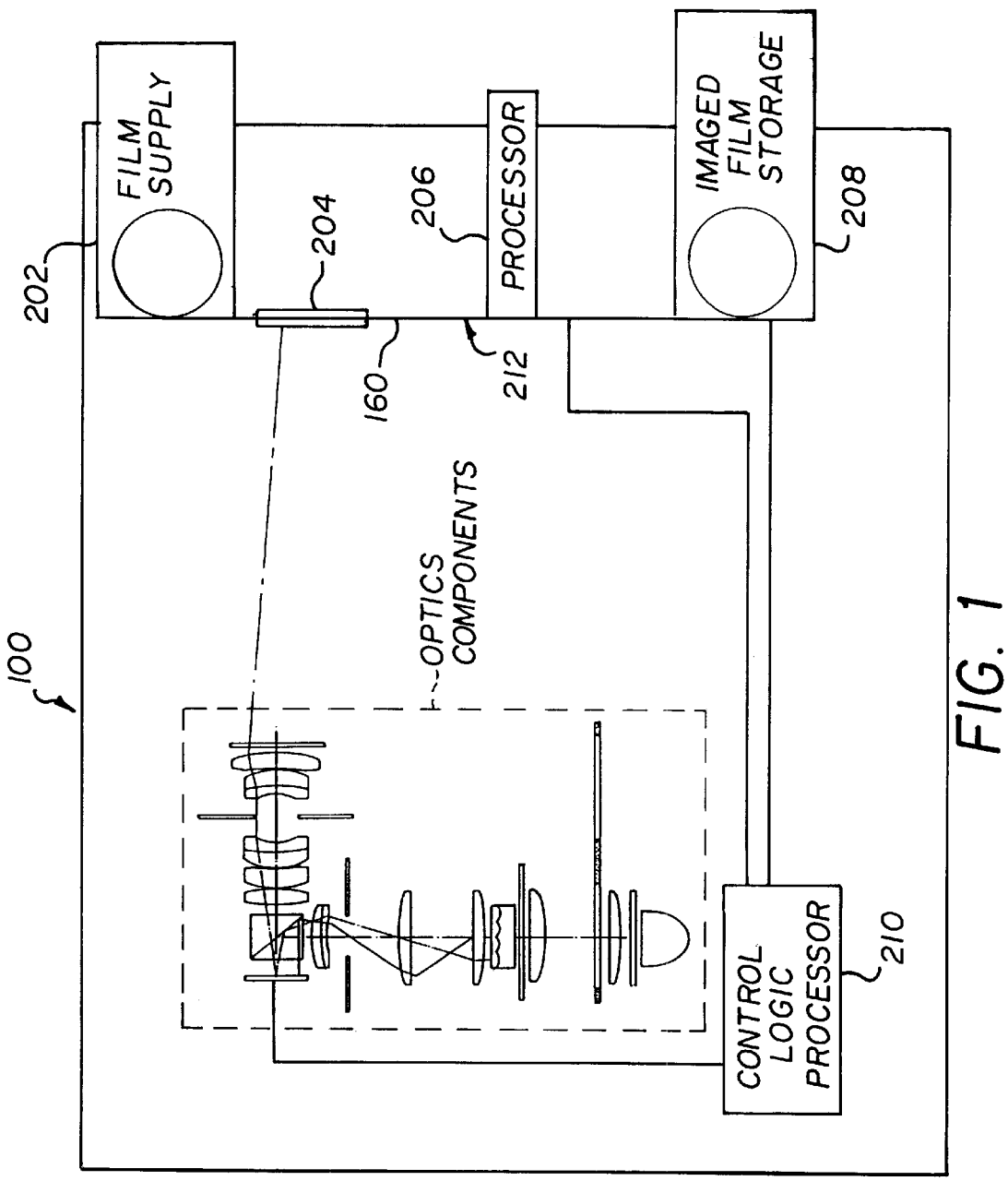
FIG. 1 is a schematic view showing a printing apparatus of the present invention.

Referring now to the drawings, wherein like reference numerals represent identical or corresponding parts throughout the several views, FIG. 1 illustrates an archival printer, such as a COM printer, referred to in general by numeral 100. Printer 100 comprises an optics components 10 and a media handling subsystem 212. Media handling subsystem 212 comprises a film supply 202, an exposure section 204, an optional film processor 206, and a film storage unit 208. A control logic processor 210 accepts and processes image data for printer 100 and controls the overall operation of optics components 10 and media handling subsystem 212 components.

The operation of printer 100 is straightforward, following the general pattern used for COM printers. To print, an undeveloped section of a photosensitive media 160 is advanced from film supply 202 into exposure section 204. Optics components 10 cooperates with control logic processor 210 to print image data onto photosensitive media 160, explained in more detail below. The exposed section of photosensitive media 160 is then ready for processing in order to develop the image. In the preferred embodiment, in which printer 100 uses dry-processed media, film processor 206 may be built into printer 100 itself, as is represented in FIG. 1. The exposed section of photosensitive media 160 is advanced to film processor 206, where the latent exposed image is developed using a heat process. For printer 100 designed for aqueous (AgX) media, the image development function of film processor 206 is carried out by a separate developing apparatus (not shown), using conventional silver-halide film development chemicals and techniques. For printer 100 using aqueous media, film storage unit 208 is typically a cassette, designed to keep the exposed photosensitive media 160 protected from ambient light and to provide a means for transfer of photosensitive media 160 to the separate developing apparatus.

Figure 2:
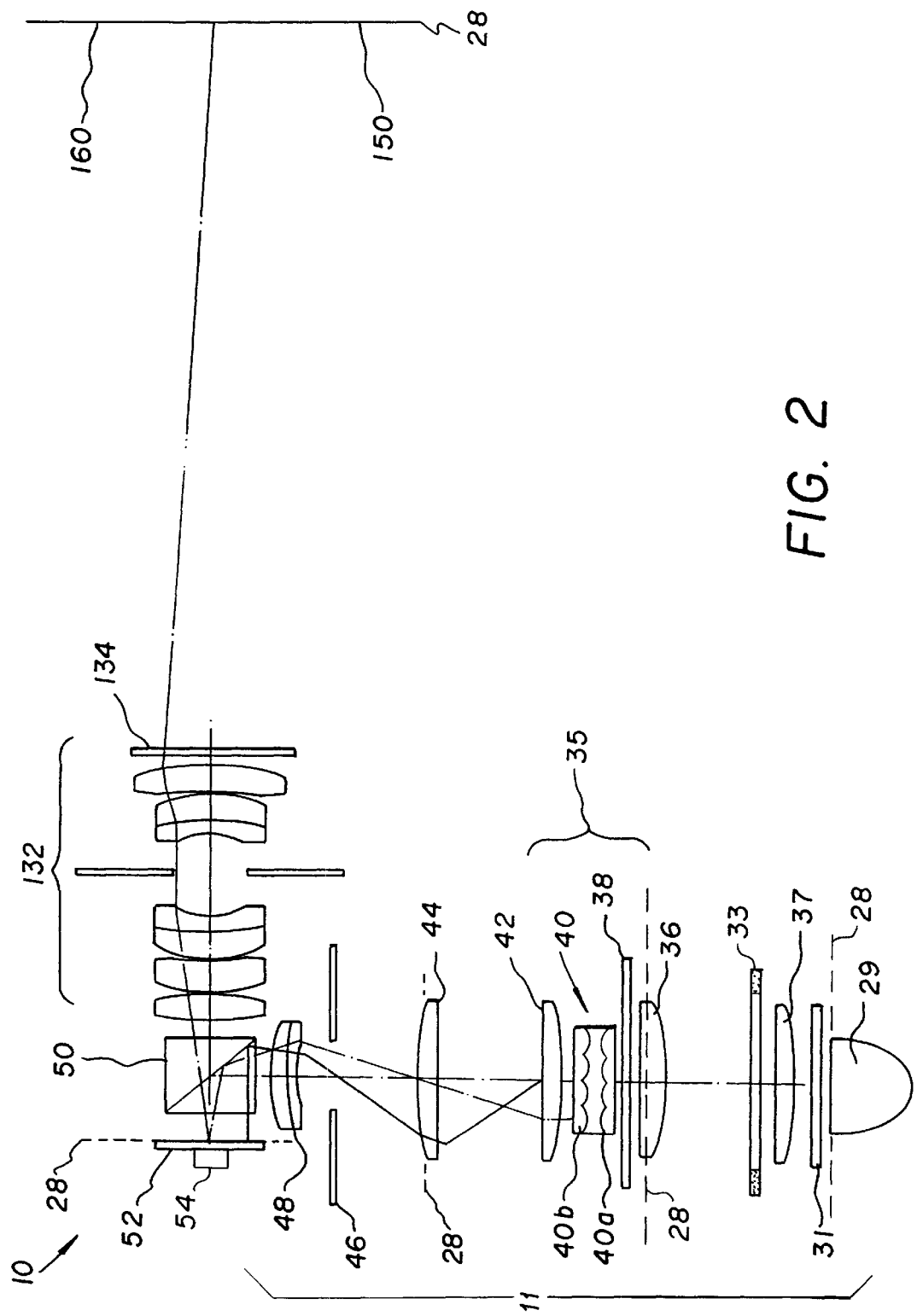
FIG. 2 is a schematic view showing optics components for a printing apparatus of the present invention.

Referring to FIG. 2, there is shown optics assembly 10, which comprises illumination optics 11. Illumination optics 11 comprises a light source 29 which can be any of a number of light sources, such as, but not limited to, a halogen lamp, one or more LEDs, one or more lasers, or any combination thereof. Light emitted from light source 29 is directed by a lens 37 and directed to an integrator assembly 35. Integrator assembly 35 comprises two field lenses 36 and 42 and a lenslet array assembly 40, acting as an uniformizer for the light. Lenslet array assembly 40 includes two lenslet arrays 40a and 40b. Lenses 36 and 37 direct the monochromatic light into the entrance aperture of lenslet array assembly 40. Conjugate planes within optics assembly 10 are indicated by dotted lines 28.

The light at the intermediate illumination plane is broken into a number of portions equivalent to the number of elements in lenslet array 40a. The individual portions are then imaged and magnified by second lenslet array 40b and second field lens 42. Light passing through an optional aperture stop 46 and a relay lens 48. Relay lens 48 is positioned immediately before a polarization beamsplitter element 50. It should also be noted that, although relay lens 48, field lens 44, and field lens 42 are shown as separate elements in FIG. 2, a single compound lens providing uniform illumination could be employed instead of the three individual lens elements 48, 44, and 42 as is depicted in FIG. 2.

Since illumination optics 11 must provide monochromatic light, it may be necessary to provide a monochromatic filter 33 disposed in the optics path. (This would be required if light source 29 were a halogen lamp, for example.) If a halogen lamp is employed as light source 29, it is advisable to incorporate an infrared rejection filter 31 following the lamp in the assembly, as shown in FIG. 2.

Polarization beamsplitter element 50, referred to in general for the purposes of this application as an optics assembly, may be replaced by other components. For example, the optics assembly may comprise a pellicle rather than a polarization beamsplitter element 50 as discussed in more detail below.

Because polarization beamsplitter element 50 may not provide adequate extinction between s-polarization state of light (not shown) and p-polarization state of light (not shown), an optical linear polarizer 38 may be incorporated prior to polarization beamsplitter element 50. There are several places where a linear polarizer 38 can be placed; one such position is immediately preceding lenslet array assembly 40. Linear polarizer 38 is used to isolate the polarization state parallel to the axis of polarization beamsplitter element 50. This serves to reinforce the polarization state determined by polarization beamsplitter element 50, decrease leakage light and thereby increase the resulting contrast ratio. Referring again to FIG. 2, light of the s-polarization state passing through polarization beamsplitter element 50 is directed to the plane of a reflective spatial light modulator 52, which is a reflective LCD in the preferred embodiment. The p-polarization state is passed through polarization beamsplitter element 50.

Figure 3:
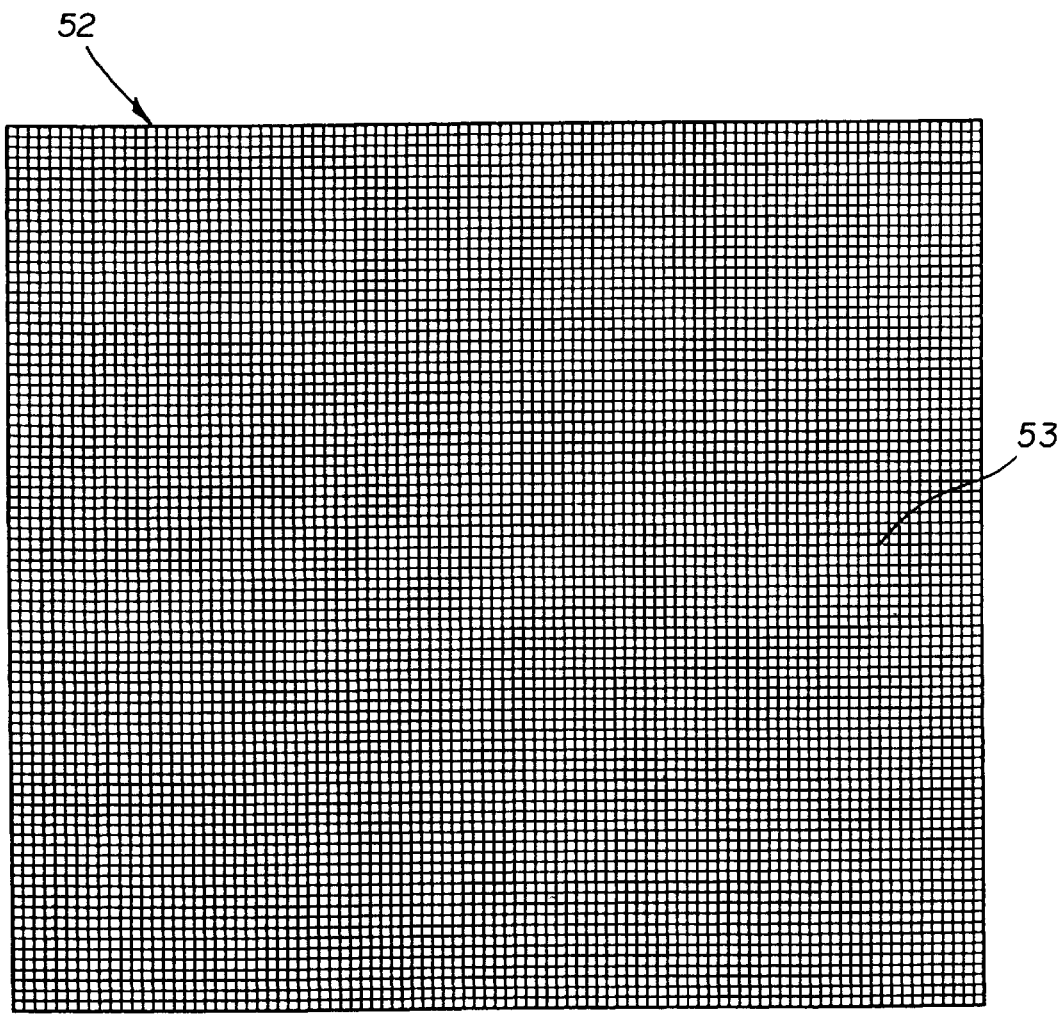
FIG. 3 is a plan view that illustrates a front surface of a multiple site spatial light modulator.

Referring to FIG. 3, the spatial light modulator 52 of the embodiment shown is designed for a two-dimensional reflective polarization-based spatial light modulator. Spatial light modulator 52 includes a plurality of modulator sites 53, each of which can be individually modulated. Light passes through spatial light modulator 52, is reflected off a back reflective surface of spatial light modulator 52, and returns through spatial light modulator 52 to be directed through a print lens assembly 132 onto an image plane 150 (FIG. 2). If a modulator site 53 is "on" or bright, during the round-trip through spatial light modulator 52, the polarization state of the light is rotated. In an ideal case the light is rotated 90 degrees. However, this ideal degree of rotation is rarely easily achieved. If a given modulator site is "off" or dark, the light is not rotated. The light that is not rotated is not passed straight through polarization beamsplitter element 50 but is redirected away from the media plane by polarization beamsplitter element 50. It should be noted that light, which is rotated by spatial light modulator 52, may become elliptically polarized. Upon passing through a linear polarizer, the light will regain linearity. However, light that is not passed through a linear polarizer will retain ellipticity.

As noted above, the most readily available choice of reflective polarization based modulators is the reflective liquid crystal modulator. Such modulators, originally developed for use in projection display, can have resolutions as high as 4000×2000 modulator sites. Currently, resolutions of 1200×1600 sites are available with footprints as small as a 0.9 inch diagonal. These high resolution reflective LCDs are often twisted nematic LCDs or homeotropically aligned reflective LCDs, although other types of reflective LCDs such as ferroelectric are often employed in projection display. Some of the key characteristics of these LCDs are high resolution, high contrast (>100:1), fast frame rate of 70 frames per second or higher, and high aperture ratio (>90%). In addition, the incorporation of a CMOS backplane increases the uniformity across the array. The LCDs are also capable of producing an eight bit gray scale either through pulse width modulation or through analog operation. In either case data is introduced digitally to the printing system, as controlled by control logic processor 210 (FIG. 1). These characteristics ensure that the reflective LCD is an excellent choice for use in a reflective printing system.

Spatial light modulator 52 can be designed in a number of different configurations. The most amenable to a low cost printing system is a single chip system. In a preferred embodiment, spatial light modulator 52 would be a single-chip device specifically designed for single color use, providing optimum frame speed.

Because of cost and availability constraints, it may be necessary to use a specific design of spatial light modulator 52 that is not optimized for the wavelength used. In such a case, there are methods for obtaining optimum performance. For example, for a given liquid crystal composition, thickness, and applied voltage, the resulting polarization rotation on an incident beam may vary as a function of wavelength. In the bright, or "on" state, this difference in rotation can effect the efficiency of the system. In other words, the percentage of incident light that is actually rotated and imaged on the media plane can vary. This difference in wavelength efficiency can be accounted for by adapting the illumination strength and exposure time, based on wavelength, in order to obtain the power density required by the media, using techniques well-known in the imaging art. The problem is particularly acute in the dark or "off state." In this state, the light is not rotated and should not be directed through polarization beamsplitter element 50 and imaged. If the light is in fact, rotated, light will leak through the imaging system and decrease the contrast.

Figure 4:
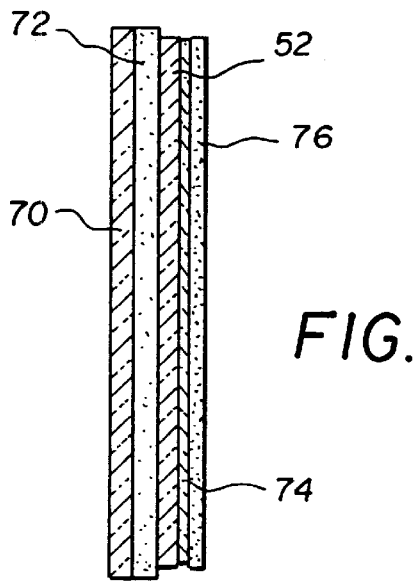
FIG. 4 shows a cross-section of a reflective modulator with motion controllers, a liquid crystal spatial light modulator, a cover glass, and a polarization compensation component.

In an alternate embodiment, contrast can be adjusted for wavelength to use polarization compensation or selection devices. Referring to FIG. 4, in which a cross-sectional view of spatial light modulator 52 is shown, a polarization compensator 76 may be introduced to the surface of spatial light modulator 52. As shown in FIG. 4, the top surface or layer includes polarization compensator 76, the second surface or layer is a cover glass 74 of spatial light modulator 52, the third layer is spatial light modulator 52 itself, with a reflective backplane. Behind spatial light modulator 52 are mounted actuators 70, 72 or mounts for actuators to position spatial light modulator 52.

An alternate method for contrast adjustment is to incorporate a polarization compensator in the path of the optical beam to correct the polarization state of the light. A single compensator may be placed in the optical path to particularly correct the off-state of the light. However, polarization compensation devices can be expensive. An efficient but inexpensive means to accomplish the same results can be obtained using linear polarizers. As was mentioned earlier, a single LCD imparts a degree of polarization rotation dependent on the color of illumination. In an effort to maximize contrast, special care must be taken to provide a truly dark "off state." Because the rotation of the light from spatial light modulator 52 is not always crossed perfectly with polarization beamsplitter element 50 in the off state, additional polarization selection must be incorporated into the optical path. Also, polarization beamsplitter element 50 is not perfect and will leak some amount of light. For these reasons, an additional sheet polarizer can be disposed either immediately before or after print lens assembly 132. This additional polarizer serves to reject leakage light that is passed through polarization beamsplitter element 50. Specifically, for a particular LCD modulator, the dark state of the light is actually rotated 7 degrees from the polarization transmitting direction of polarization beamsplitter element 50. To correct this in the preferred embodiment, a second polarizer 134 (FIG. 2) is provided, rotated 7 degrees off-axis to suppress leakage light. The particular angle at which polarizer 134 must be placed is a function of the particular reflective LCD chosen for the printing system. A suggested placement of polarizer 134 in the optics path is shown in FIG. 2.

Dithering

In an alternative embodiment of printer 100, dithering may be used to increase the inherent LCD resolution and to compensate for modulator site defects. A dithering pattern for a standard high aperture ratio LCD spatial light modulator 52 is shown in FIGS. 5a–5d.

To dither a full aperture LCD is to image the spatial light modulator 52 at one position, and reposition spatial light modulator 52 a fraction of a modulator site distance away and image. In so doing, multiple copies of the same images are created and overlapped. By overlapping multiple images, the system acquires a redundancy that corrects for modulator site failure or drop out. Furthermore, by interpolating and updating the data between positions, the effective resolution is increased. Referring to the example dithering scheme depicted in FIGS. 5a–5d, spatial light modulator 52 is first positioned at a first modulator position 61 and modulator sites 63 are image (FIG. 5a). Spatial light modulator 52 is then imaged at second modulator position 62. Spatial light modulator 52 is then displaced on half of a modulator site longitudinally from previous second modulator position 62, which means it is diagonally displaced from initial first modulator position 61 to a third modulator position 64 (FIG. 5d). Modulator sites 63 are illuminated and the media exposed again. Spatial light modulator 52 is then moved to a fourth modulator position 65 that is laterally displaced from third modulator position 64 (FIG. 5c). The media is then exposed at this position. Using this pattern, there is effectively a fourfold increase in the amount of data written. This serves to increase image resolution and provide means to further sharpen images. Alternately, with a high aperture ratio, it may be sufficient to simply dither in one diagonal direction (that is, for example, from first modulator position 61 shown in FIG. 5a to third position modulator 64 shown in FIG. 5d in order to achieve suitable results.)

Dithering requires motion of the modulator in two directions. Each increment of motion is approximately between 5

μm and 20 μm for a typical reflective LCD modulator. In order to achieve this incremental motion, many different actuator 54 or motion assemblies shown schematically in FIG. 2, can be employed. For example, the assembly can use two piezo-electric actuators.

Figure 6:
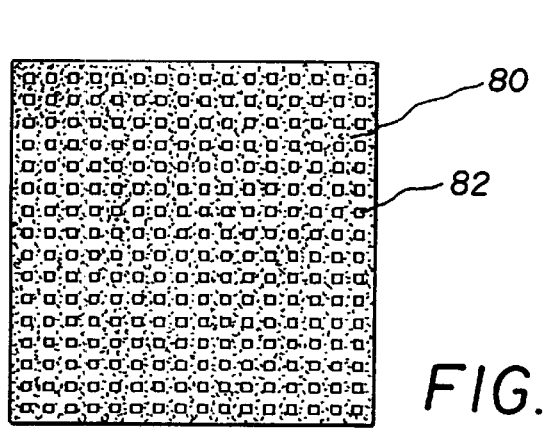
FIG. 6 is a plan view that illustrates a front surface of a sub-apertured spatial light modulator.

In an alternate embodiment for dithering, requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site. The result is a modulator site for which only a fraction of the area transmits light. Referring to FIG. 6, there is shown an illustration of a sub-apertured area modulator. Black regions 80 represent the non-reflecting, non-transmitting regions of the device. Clear areas 82 represent the sub-apertured transmitting areas of the LCD.

Figure 7:
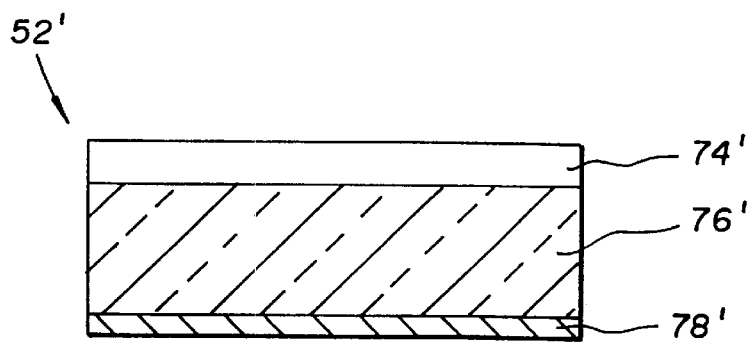
FIG. 7 is a cross-sectional view of a reflective spatial light modulator.

FIG. 7 is a cross-sectional view of an alternate two-dimensional LCD spatial light modulator 52'. There is a frame 78' which can be in the form of a CMOS backplane on top of which rests an LCD 76'. Above the LCD 76' is a cover glass 74'. Sub-apertures, to effect the pattern of FIG. 6, may exist as a mask in frame 78', as a pattern in LCD 76', or a pattern on the surface of cover glass 74' closest to LCD 76'. In an effort to double the resolution in each direction, a sub-aperture of approximately 25% may be employed. By dithering a 25% aperture ratio device, it is possible to double the resolution in the image.

FIGS. 8a–8d represent the dithering of a sub-apertured device. Spatial light modulator 52 is positioned at a first modulator position 84 (FIG. 8a) and sub-apertured modulator sites 92 are positioned and exposed while darkened (non-reflecting) regions 94 are not imaged onto photosensitive media 160. Spatial light modulator 52 is moved to a second modulator position 86 (FIG. 8b) a half full modulator site (sub-aperture and surrounding non-reflective area) laterally displaced from previous position 84. Spatial light modulator 52 is then exposed at second modulator position 86. Spatial light modulator 52 is then displaced a half full modulator site longitudinally from previous position 86 to third modulator position 88 (FIG. 8c), which means it is diagonally displaced from the starting point at first modulator position 84. Spatial light modulator 52 is then illuminated and the media exposed again. Spatial light modulator 52 is then moved to a fourth modulator position 90 (FIG. 8d) that is laterally displaced from third modulator position 88. The media is exposed at this position. Effectively, there is a four times increase in the amount of data written. This serves to increase image resolution and to provide means for further image sharpening. A sub-aperture of 25% by area, as approximated in FIG. 6, will give the highest image quality for a four step dither, however, in an effort to allow for redundancy in the modulator sites, it is better to use a sub-aperture ratio of greater than 25% by area.

When the sub-apertures are not placed symmetrically within each cell, dithering becomes quite difficult. Different periods of motion can be employed; for instance, one full modulator site width lateral motion combined with half a modulator site vertical motion makes a dither pattern. However, such motion is quite prone to image artifacts. A simple way to get around this problem is to dither using only odd columns, then repeat the dither using only even columns. Alternately, the dither algorithm may follow another pattern, dithering even rows, then dithering odd rows, for example.

Figure 9:
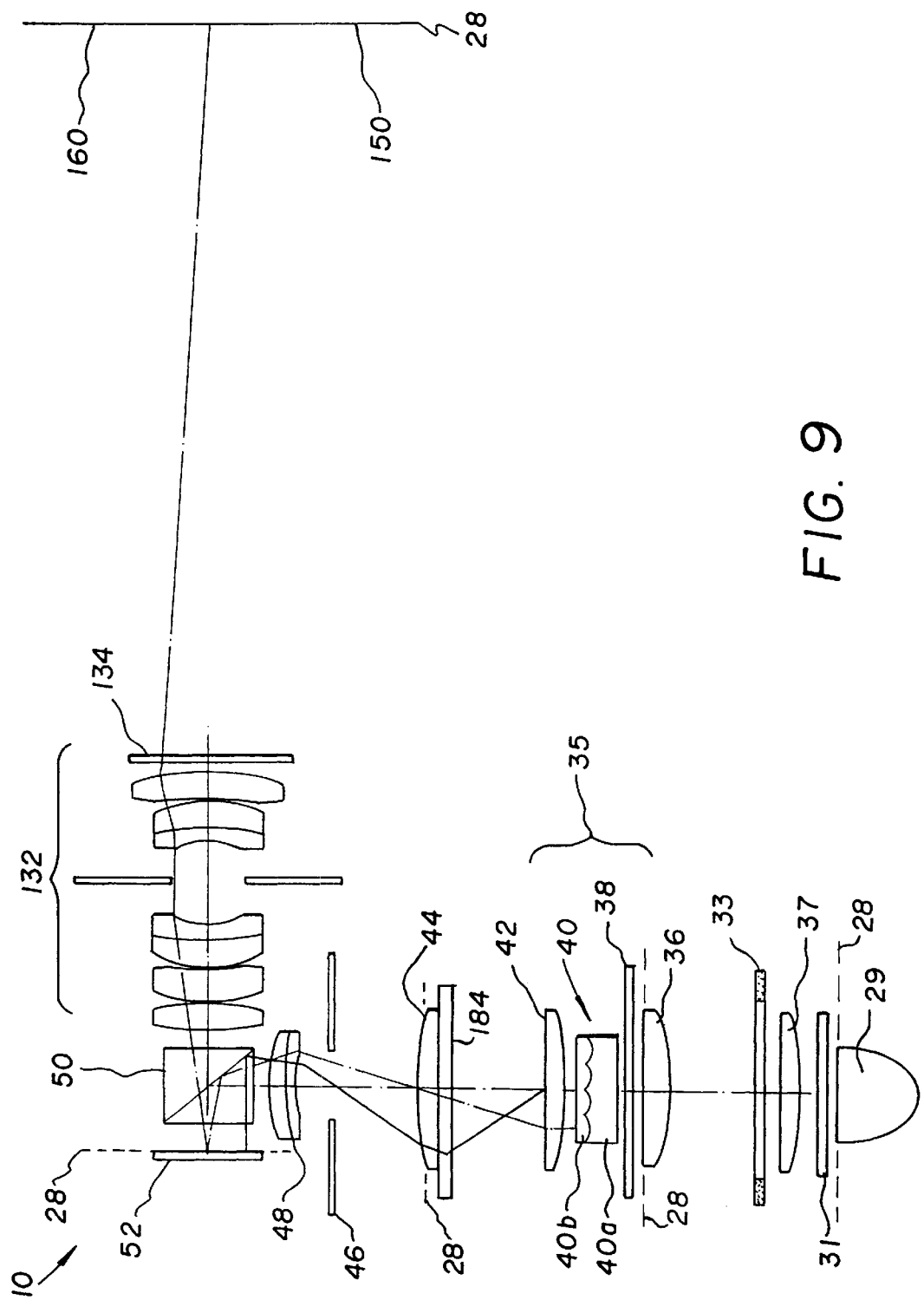
FIG. 9 is a schematic view showing optics components for a printing apparatus of the present invention, including an intermediate image plane for inclusion of a dither mask.

In an alternate embodiment, spatial light modulator 52 is left un-dithered. But, dithering takes place in one of conjugate image planes 28 as is shown in FIG. 9. In this embodiment, a mask 184 containing the sub-aperture is placed at conjugate plane 28 in the illumination optics 11. Mask 184 is dithered while the information content to the modulator sites at spatial light modulator 52 is updated. This allows a sub-apertured image to be recorded although the device may not be sub-apertured. It is also possible to create an intermediate image plane, however, this will prove cumbersome.

Another means by which to accomplish the dithering is to place mask 184 in the image plane immediately before photosensitive media 160. This mask 184 can then be dithered while data is refreshed to the device between dither positions. This method of dither will accomplish the same effect as the previous method of the intermediate image.

Following spatial light modulator 52 and polarization beamsplitter element 50 in FIG. 1 is a print lens assembly 132. Print lens assembly 132 provides the correct demagnification of the image of spatial light modulator 52 to image plane 150 where photosensitive media 160 is located. It should be noted that print lens assembly 132 can be configured for reduction required for micrographics or for magnification (required for diagnostic imaging.) The configuration of print lens assembly 132 components is dependent on how printer 100 is used. With this arrangement, the same illumination optics 11 and spatial light modulator 52 components can be used with different printer 100 types.

The optical system designed using the arrangement disclosed in FIG. 1 has been shown to be compact, low in cost, and efficient. The combination shown in FIG. 1, using a high intensity light source 29 and supporting illumination optics 11 with a reflective LCD spatial light spatial light modulator 52 and print lens assembly 132 optics optimized for COM-quality reduction, provides high levels of exposure energy suited to the resolution and contrast requirements of the micrographics environment. Moreover, because optics assembly 10 is capable of providing high exposure energy, optics assembly allows printer 100 to use dry-process media, thereby providing performance and environmental benefits.

Achieving Grayscale Output

Printer 100 is capable of achieving sufficient uniformity while retaining the grayscale performance. Spatial light modulator 52 alone can receive up to 8 bits of bit depth. However, 8 bits to the modulator may not translate to 8 bits at the media. Furthermore, LCD modulators are known to exhibit some measure of roll-off or loss of contrast at the edges of the device. To print an adequate grayscale range and provide additional bit depth, the present invention can take advantage of the fact that modulators 52 designed for projection display generally refresh data faster than is required for printing. Consequently, it is possible to create a single image at the photosensitive media 160 as a superposition of a series of images. The individual images that comprise the final image can vary both in information content and illumination.

It is possible to maintain the same image data at spatial light modulator 52 and, by altering the illumination level from light source 29, introduce additional bit depth. By varying the illumination level, (and/or duration), and by altering the data content controlling spatial light modulator 52, printer 100 can build a composite image out of a series of preliminary images. The superposition of the images of varied information content and varied illumination level introduces additional bit depth to the composite image.

Non-uniformity Compensation

Using the present invention, printer 100 can correct for some non-uniformity such as roll-off at spatial light modulator 52 edges. One way to accomplish this is to introduce additional image data to spatial light modulator 52, activating only individual modulator sites 53 on the outer edge of spatial light modulator 52. These added images can then be exposed and superimposed on the other images thus giving additional depth to the edge regions. An example method would be to scan a series of images taken at LCD spatial light modulator 52, create data maps and convolve all input data with an initial map of LCD spatial light modulator 52 to correct the image. Similar techniques can be used to adjust for modulator non-uniformities that are known prior to operation.

Alternative Embodiments

Figure 10:
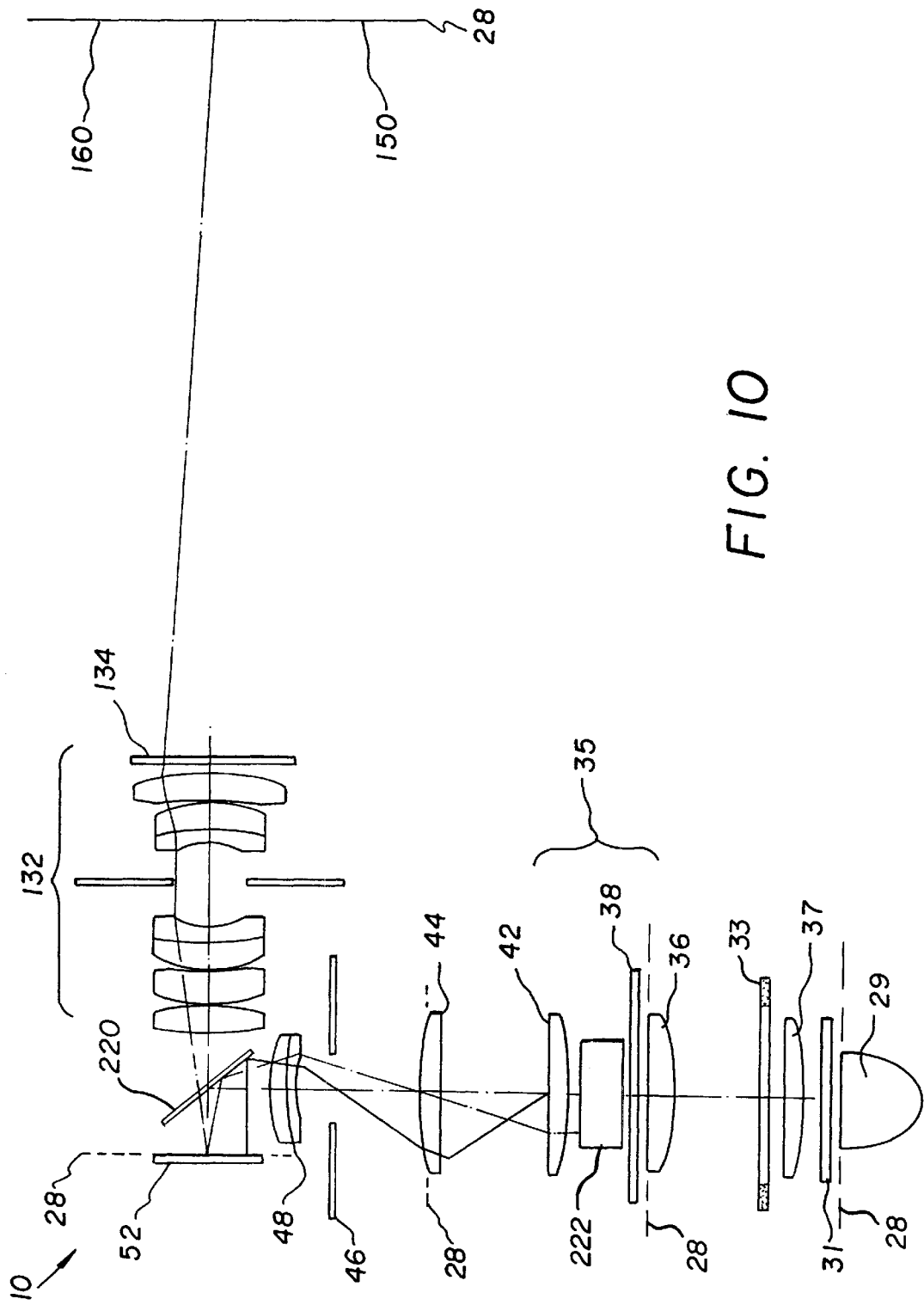
FIG. 10 is a schematic view showing optics components for a printing apparatus of the present invention, using an alternative arrangement of an optics assembly.
Figure 11:
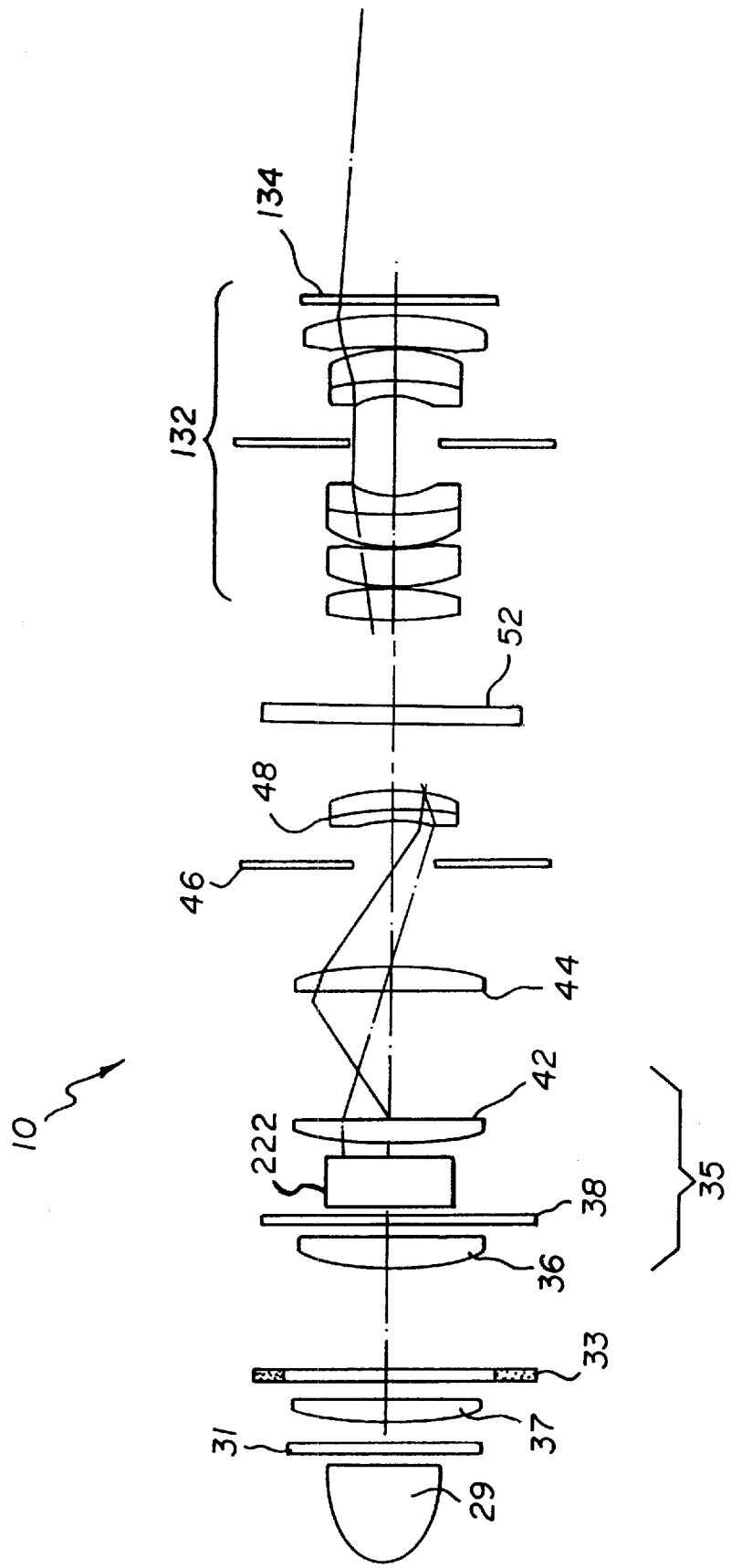
FIG. 11 is a schematic view showing optics components for a printing apparatus of the present invention, showing an alternative arrangement utilizing a transmissive LCD.

The design of printer 100 allows a number of alternate embodiments within the scope of the present invention. Referring to FIGS. 10 and 11 alternate arrangements of components are shown. Notable changes to components include the following:

(1) Use of an alternative uniformizing component, such as an integrating bar 222 in place of lenslet array assembly 40. While lenslet arrays, in general, may provide better uniformity, integrating bar 222 can be an appropriate substitute for monochromatic printing applications, particularly when using coherent light sources, such as lasers. The integrating bar may help to minimize coherence effects.

(2) Use of an alternative optics assembly. A pellicle 220 is substituted for polarization beamsplitter element 50, and provides sufficient beamsplitting capability for monochromatic printing. This embodiment offers cost-saving advantages over polarized beamsplitters. Pellicles are well suited to monochromatic applications, such as is disclosed above, but may cause image artifacts with polychromatic systems. Specifically, pellicles do not extinguish or redirect light with the efficiency of a beamsplitting cube. In addition, over a narrow wavelength band, some pellicles can demonstrate interference effects. For example, if an optical system were to have competing narrow wavelength bands, such as 630 nm and 460 nm, interference effects in the different wavelength regions could cause significantly non-uniform illumination at the modulator. Additionally, pellicles are more useful in systems where light intensity is not a major concern, since pellicles are not designed for applications using high levels of optical power. It should be noted that, because the pellicle is not, by itself, a polarization-sensitive device, a prepolarizer is required. If used with optics components 10 of the present invention, the first polarizer would eliminate 50% of incident unpolarized light; the pellicle would then eliminate another 50% of the remaining light. Because of this, spatial light modulator 52 would receive only 25% of the potential illumination. It is instructive to note that, in the optics components 10 as described above, light intensity demands are not severe and illumination is monochromatic for any given exposure, allowing the use of pellicle 220 as an alternative.

(3) Use of alternate beam-steering components. Other suitable alternative for optical assembly other than use of polarization beamsplitter element 50 or pellicle 220 include a simple turning mirror or prism.

(4) Use of transmissive LCD components for spatial light modulator 52. For some COM applications, there may be sufficient resolution and contrast available using a transmissive LCD spatial light modulator. As is shown in FIG. 11, use of a transmissive modulator 50 removes the turn in the optics path and can simplify the design.

Because of the digital addressability of the LCD device and the flexibility in varying level of illumination, the printing solutions described above provide an adequate bit depth and reasonable timing for use in a COM printer. Using the printer of the present invention takes advantage of economical, commodity LCD technology to produce low cost, high resolution prints, with high productivity.

The use of reflective liquid crystal technology allows for very high resolution two-dimensional printing. Furthermore, the use of dithering, particularly sub-apertured dithering provides means to further increase the resolution and avoid artifacts due to modulator site failure.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Parts List

10. Optics components
11. Illumination optics
28. Conjugate planes
29. Light source
31. Infrared rejecting filter
33. Monochromatic filter
34. Combiner field lens
35. Integrator assembly
36. Field lens
37. Lens
38. Linear polarizer
40. Lenslet array assembly
40a. Lenslet array
40b. Lenslet array
42. Field lens
44. Field lens
46. Aperture stop
48. Relay lens
50. Polarization beamsplitter element
52. Spatial light modulator
52'. LCD modulator
53. Modulator site
54. Actuator
61. First modulator position
62. Second modulator position
63. Modulator sites
64. Third modulator position
65. Fourth modulator position
66. Stops
70. Actuator
72. Actuator
74. Cover glass
74'. Cover glass
76 Polarization compensator
76'. LCD
78. Frame
78'. Frame
80. Black regions
82. Clear areas
84. First modulator position
86. Second modulator position
88. Third modulator position
90. Fourth modulator position
92. Modulator sites
94. Non-reflecting region
100. Printer 132. Print lens assembly
134. Polarizer
150. Image plane
160. Photosensitive media
184. Mask
202. Film supply
204. Exposure section
206. Film processor
208. Film storage unit
210. Control logic processor
212. Media handling subsystem
220. Pellicle
222. Integrating bar

What is claimed is:

1. A monochrome printing apparatus for recording an image from digital image data onto a photosensitive medium, said apparatus comprising:
   (a) a monochrome light source;
   (b) a uniformizer for uniformizing a wavefront of light emitted from said light source;
   (c) a polarizer for filtering light uniformized by said uniformizer to provide a polarized beam having a predetermined polarization state;
   (d) a spatial light modulator having a plurality of individual elements capable of altering said polarization state of said polarized beam to provide an exposure beam for printing, a state of each of said elements controlled according to said digital image data;
   (e) an optics assembly for directing said polarized beam to said modulator and said exposure beam from said spatial light modulator;
   (f) a lens assembly for directing said exposure beam onto said photosensitive medium; and
   an actuator coupled to said spatial light modulator, said actuator disposed to provide motion for exposure dithering.

2. The apparatus of claim 1 wherein said spatial light modulator comprises a transmissive liquid crystal display (LCD).

3. The apparatus of claim 1 wherein said spatial light modulator comprises a reflective liquid crystal display (LCD).

4. The apparatus of claim 1 wherein said spatial light modulator comprises a digital inicromirror device.

5. The apparatus of claim 1 wherein said uniformizer comprises a lenslet array.

6. The apparatus of claim 1 wherein said uniformizer comprises an integrating bar.

7. The apparatus of claim 1 wherein said monochromatic light source comprises a lamp.

8. The apparatus of claim 7 wherein said optics assembly comprises a monochromatic filter.

9. The apparatus of claim 7 wherein said optics assembly comprises an infrared rejecting filter.

10. The apparatus of claim 1 wherein said monochromatic light source comprises at least one light emitting diode.

11. The apparatus of claim 1 wherein said monochromatic light source comprises a laser.

12. The apparatus of claim 1 wherein said optics assembly comprises a beamsplitter.

13. The apparatus of claim 12 wherein said beamsplitter comprises a polarization coating.

14. The apparatus of claim 1 wherein said optics assembly comprises a pellicle.

15. The apparatus of claim 1 wherein said optics assembly comprises a turning mirror.

16. The apparatus of claim 1 wherein said optics assembly comprises a prism.

17. The apparatus of claim 1 wherein said actuator comprises a piezoelectric actuator.

18. The apparatus of claim 1 wherein said lens assembly provides reduction of the image.

19. The apparatus of claim 1 wherein said lens assembly provides magnification of the image.

20. The apparatus of claim 1 wherein the image written to said photosensitive imaging medium is developed using a chemical bath.

21. The apparatus of claim 1 wherein the image written to said photosensitive imaging medium is developed using heat.

22. The apparatus of claim 1 wherein apertures are provided for said spatial light modulator.

23. The apparatus of claim 1 further comprising a mask in the path of said polarized beam.

24. The apparatus of claim 1 further comprising a mask in the path of said exposure beam.

25. The apparatus of claim 1 wherein said image from said digital image data is a grayscale.

26. A method for printing a monochrome image from digital image data onto photosensitive media, the method comprising:
   (a) providing substantially monochrome light having a uniformized wavefront as a source beam;
   (b) polarizing said source beam;
   (c) modulating said polarized source beam in accordance with said digital image data to provide an exposure beam by rotating a polarization state of said polarized source beam;
   (d) directing said exposure beam onto said photosensitive media; and
   (e) incrementally altering a position of a spatial light modulator to dither said exposure beam.

27. The method of claim 26 wherein the step of providing substantially monochrome light having a uniformized wavefront comprises the step of disposing an optical integrator in the path of a light source.

28. The method of claim 26 wherein the step of providing substantially monochrome light having a uniformized wavefront comprises the step of disposing a monochromatic filter in the path of a light source.

29. The method of claim 26 wherein the step of providing substantially monochrome light having a uniformized wavefront comprises the step of disposing a beamsplitter in the path of a light source.

30. The method of claim 26 wherein the step of modulating said source beam comprises the step of varying an on time of an element of said spatial light modulator.

31. The method of claim 26 wherein the step of modulating said source beam comprises the step of varying a drive signal provided to an element of said spatial light modulator.

32. The method of claim 26 wherein said step of directing said exposure beam comprises the step of magnifying said exposure beam.

33. The method of claim 26 wherein said step of directing said exposure beam comprises the step of demagnifying said exposure beam.

34. A method for printing a monochrome image from digital image data onto photosensitive media, the method comprising:

(a) providing substantially monochrome light having a uniformized wavefront as a source beam;

(b) modulating said source beam in accordance with said digital image data to provide an exposure beam;

(c) directing said exposure beam onto said photosensitive media; and (d) incrementally altering a position of a spatial light modulator to dither said exposure beam.

* * * * *